Patented May 22, 1945

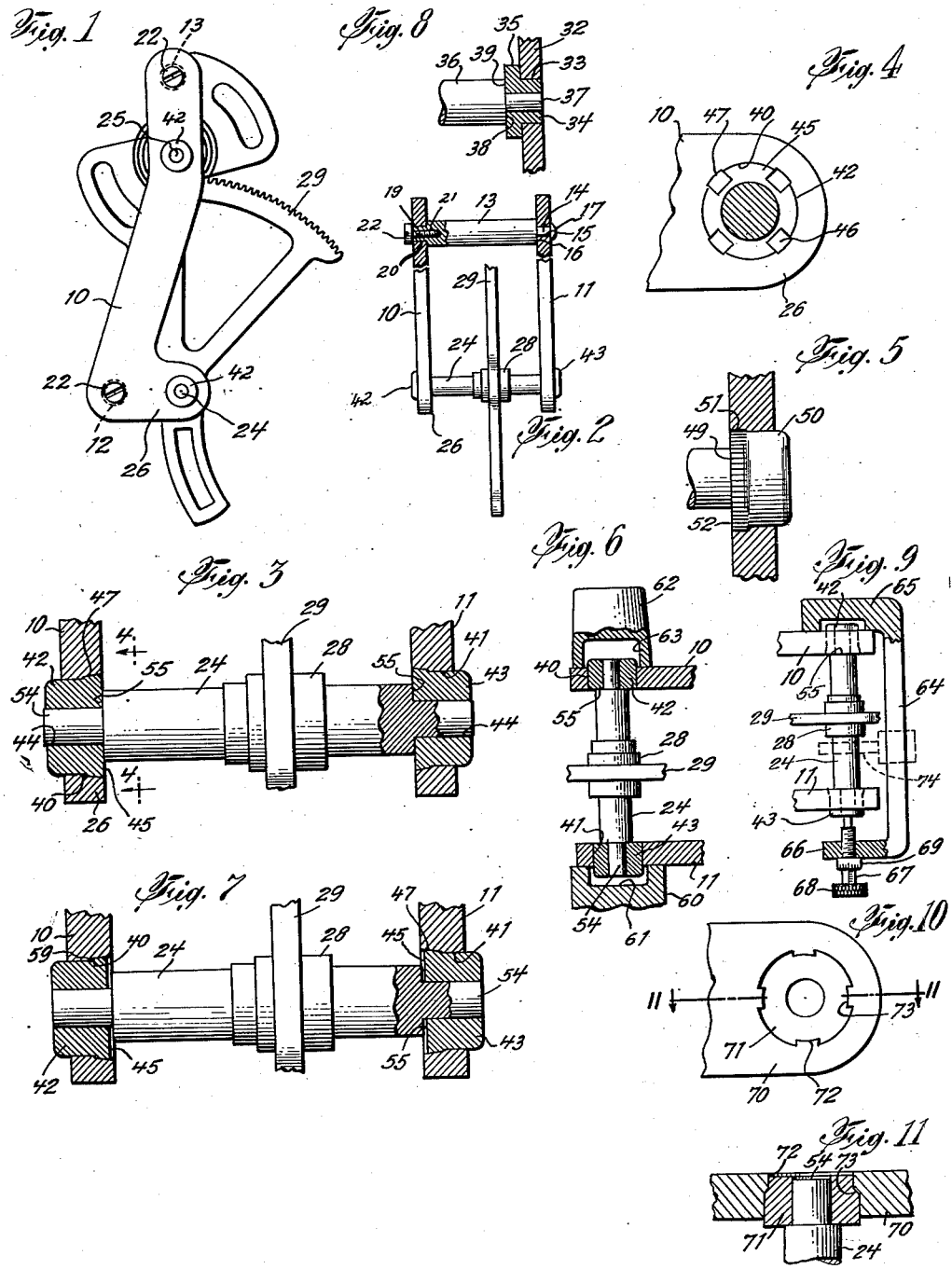

2,376,406

UNITED STATES PATENT OFFICE 2,376,406

BEARING STRUCTURE

Richard I. N. Weingart, Glen Head, N. Y.

Application February 12, 1943, Serial No. 475,692

5 Claims. (Cl. 308—22)

This invention relates to an improved bearing structure designed primarily, though not exclusively, for shafts in measuring instruments, horological instruments, and the like, and has for its principal object the provision of a novel bearing element wherein end play of the shaft can, at the time of manufacture of the instrument, be reduced to a predetermined and desired minimum.

End play of shafts in any instrument or apparatus can be reduced by increased accuracy in construction of the parts. This greatly increases the cost, however. In any given instance, if the tolerances are decreased by one-half, the cost may increase four or five times, and this results in prohibitive cost of the instrument. Measuring instruments generally are subjected to considerable vibration. These instruments normally have a plurality of shafts, including a driving shaft and a driven shaft. This continuous vibration causes continuous endwise shifting of the shaft, which, in turn, causes the driving and driven gears to cut into each other in a short time, and thus greatly reduces the accuracy of the measurement.

An important object of the present invention resides in the provision of means for reducing this endwise play, in the case of measuring instruments such as pressure gauges, speed indicators, and the like, from ±.003 or .004, to ±.0003 or .0004, without requiring a reduction of the tolerances of the individual parts, and without increasing the final cost of the instrument.

Another object of the present invention is the provision of an improved thrust bearing element which is simple and inexpensive to manufacture, and which provides a flat, polished thrust bearing surface, thus greatly reducing friction in the shaft.

In the drawing:

Fig. 1 is a front elevation of a measuring instrument frame illustrating one form of the present invention.

Fig. 2 is a broken side elevation thereof.

Fig. 3 is an enlarged broken side elevation, partially in section, of the structure shown in Fig. 2.

Fig. 4 is a section taken on line 4—4 of Fig. 3.

Fig. 5 is a broken sectional view showing a modified form of the bearing structure.

Fig. 6 is a broken sectional view illustrating the method of the present invention of obtaining a predetermined amount of end play in the shaft.

Fig. 7 is a sectional view similar to Fig. 3, but showing the relation of the parts, in a somewhat exaggerated form, after the bearing structure has been completed.

Fig. 8 is a sectional view illustrating the conventional form of bearing structure presently used in measuring instruments, and the like.

Fig. 9 is a view similar to Fig. 6, but illustrates an alternative method of the present invention.

Fig. 10 shows an end elevation of a shaft wherein the staking or upsetting is provided in the frame rather than in the bearing bushing.

Fig. 11 is a section taken on line 11—11 of Fig. 10.

Fig. 12 is a broken section taken through a further modified bearing structure when the parts are in their initial assembled position.

Fig. 13 shows the same bearing structure in finished condition.

Referring now more particularly to the drawing, Figs. 1 and 2 illustrate a conventional movement for a measuring instrument comprising spaced frame members 10 and 11. These frame members may be maintained in such spaced relationship by means of a plurality of spacing bushings 12 and 13. These spacing elements are conventional, one common form being shown in some small detail in Fig. 2, and which includes at one end thereof a reduced portion 14 which passes through an aperture 15 in the frame, the reduced portion forming a shoulder 16 which abuts against frame member 11. When the frame is assembled, this reduced portion may be headed at its outer end, as shown at 17, thus securing frame member 11 thereto. At its opposite end, the bushing is also formed with a reduced portion 19 which passes through an aperture 20 in frame member 10, this end of the bushing further having a threaded aperture 21 which receives a headed machine screw 22.

The number of such frame spacing elements is, of course, a matter of choice, depending upon the number of shafts in the movement and also upon other factors. For pressure gauges and similar instruments where only one driving shaft and one driven shaft is provided, two of such spacers are sufficient. In the present instance, the driving shaft is designated as 24, and the driven shaft as 25. The frame is provided with an angular extension 26 which supports one bearing element of the present invention at its outer end. Driven shaft 25 in this instance is mounted adjacent to the upper end of the frame at a point which is spaced from upper spacer bushing 13. This driving shaft may include an enlarged central portion 28 upon which is mounted a segmental driving gear 29, and no details of the driven gear are shown for the reason that neither the driving gear nor the driven gear, per se, form any part of the present invention.

For the purpose of better illustrating the principles underlying the present invention, reference is had to Fig. 8 which illustrates a conventional shaft mounting of the prior art. In this instance, the frame member 32 is provided with a straight aperture 33 which receives, preferably with a force fit, a bearing bushing 34 having a shoulder or flange 35 which engages the inner surface of frame member 32 and limits the outward movement of the bearing bushing 34. The shaft 36 is provided with a reduced terminal portion 37 which is received within an aperture in the bearing bushing, the shoulder 38 formed by such reduced portion of the shaft engaging the inner surface 39 of the shoulder 35 of the bearing bushing 34. Accordingly, it will be appreciated that this inner surface forms a thrust bearing surface for the shoulder 38 of the shaft.

The spacing bushings for the frame will, of course, be of a predetermined length, and the shaft, between the opposed shoulder portions 38, will likewise be of a predetermined length. The amount of end play in such a shaft will, of course, be dependent upon the tolerances called for in any given instance. If it is desired to provide only a few thousandths of an inch of end play, it will be necessary to construct the parts with a relatively high degree of accuracy. In most instances, however, the ultimate selling price of the measuring instrument does not justify close tolerances, and accordingly, in order to avoid freezing of the shaft, nine out of ten of the shafts will have very considerable end play. This, of course, is well known in the art.

Now, referring more particularly to the bearing structure of the present invention and to the method of forming the same, it will be noted that frame members 10 and 11 are provided with straight aligned apertures 40 and 41. These apertures 40 and 41 receive bearing bushings 42 and 43, which are similarly formed and are provided with bearing apertures 44. In the construction shown, the bearing bushings will preferably be of harder metal than the metal forming the frame members. The external diameter of bearing bushings 42 and 43 is such as to be received snugly with a force fit within apertures 40 and 41 in the frame members.

Before the bearing bushings are inserted within the apertures, however, their inner surface 45 is "staked" at a plurality of points adjacent to the periphery, as illustrated at 46 in Fig. 4. This staking or upsetting may be done with a die or punch formed with a plurality of spaced punching points or flat surfaces adapted to engage this inner surface 45 adjacent to its periphery. When the die is in engagement with this surface, it is struck a forceful blow which displaces some of the metal outwardly, as shown at 47. This step of moving the metal outwardly at a plurality of spaced points on the inner surface of the bearing bushing adjacent to its periphery may also be accomplished by a slow application of presure, although the upsetting method possibly is preferable. Whichever method is used, however, the result will be generally that shown in Fig. 3; that is to say, the projecting portions do not extend the full width of the bushing, but are confined to the area adjacent to this inner surface 45 of the bearing bushing. An equally satisfactory result may be obtained by knurling the periphery of the bushing 50, as shown in Fig. 5, adjacent to this inner surface 52. This knurled surface is shown at 49, and the forming of the closely-spaced indentations causes the metal between the indentations to move outwardly, thus forming a plurality of closely-spaced splines 51 in such outer periphery. Another way of accomplishing the desired result is to cut actual splines by removing the metal, all as is well known in the art.

For convenience in description, these projections, which lie outside the periphery of the bearing bushing in its initial state, will be referred to hereinafter as splines. The initial diameter of the bushing should be such as to have a close fit in the frame aperture, but not necessarily a force fit. Whether the bushing is staked, as shown in Fig. 4, or knurled, as shown in Fig. 5, or splined, it will be appreciated that the deformation of such outer periphery must be confined to an annular area adjacent to the inner surface (45 or 52) of the bushing. In other words, the splines must not extend the full width of the bearing bushing.

When the bushing is inserted within the aperture in the frame, it is inserted from the inner end of such frame aperture. The bushing is moved outwardly, and in the course of this outward movement, when the splines eventually reach the metal in the frame, they begin to cut slots or keyways in the aperture. Preferably, the bushings are moved outwardly through the frame aperture to a point wherein their inner surface is substantially plane with the inner surface of the frame members, as shown in Figs. 3 and 5. By providing a fairly snug fit between the unsplined portion of the bushing and its supporting aperture, the bearing bushing aligns itself in the aperture before the keyways are cut. This subsequent cutting does not disturb this alignment.

The shaft 24 is formed with the usual reduced terminal portion 54, thus forming a shoulder 55 which engages the inner surface 45 of the bearing bushing. The dimensions of the spacer bushings in this instance, relative to the length of the shaft between opposed shoulders 55, is such as to cause the inner surfaces of bearing bushings 42 and 43 to engage such shoulders with even a fair degree of pressure when the frame members are initially assembled. The tolerances, however, need not be too fine in view of the subsequent operation. In other words, when the frame members are initially assembled, the bearing bushings engage the shoulders 55 of the shaft with sufficient pressure to freeze the shaft against rotation. At this stage there should be no end play in the shaft whatsoever.

The next step in the method is illustrated in Fig. 6. One frame member 11 is rested on a stationary die 60 having an aperture 61 of slightly greater diameter than that of bushing 43. In other words, when frame member 11 is positioned on the stationary die, such die does not engage the bushing. An upper die 62 having a similarly shaped aperture 63 is placed on the outer surface of the opposite frame member 10, also not engaging bushing 42. Die 62 is then struck a light blow with a hammer, and since bushing 42 which is carried in frame member 10 cannot move downwardly due to engagement with shoulder 55 of shaft 24, it will be apparent that such frame member 10 is moved downwardly with reference to the bushing 42 which it carries.

In other words, the bushing is moved outwardly in aperture 40. Care must be taken not to move the bushing too far, as the result of any given blow, since by virtue of the splined construction of the bushing it should not be moved in the opposite direction in case the blow has been too severe. A little experience on the part of the operator will teach him the exact strength of the blow, and if the bushing is accordingly forced outwardly in the aperture a few ten thousandths of an inch at a time, testing the shaft after each blow, it can be readily determined when the shaft is free to turn, and at such time it will be observed that the end play of the shaft is almost imperceptible. The relation of the parts when the bearing structure is finished is shown in Fig. 7, although, of course, this shows an exaggerated amount of end play in the shaft. It will be noted that the slot or recess cut by the spline terminates at the point designated 59. This shoulder or terminal of the slots prevents further outward movement of the bearing bushing. If the slots extended the full width of the aperture, the intended results would be largely defeated.

If the method shown in Fig. 6 is employed, the spacer bushings of the frame should be spaced at least a slight distance from the bearing elements supporting the shafts. The reason for this is that when the frame is struck with die 62, the frame should have a measure of flexibility in order that it may spring back to its original position after each blow has been struck. In other words, striking the frame in the manner described does not permanently bend or otherwise deform the frame, but merely temporarily flexes the frame portion which is struck. Thus, each blow causes the bushing to move further outwardly in its supporting aperture, and when the frame springs back to its normal position, increased end clearance for the shaft is provided.

When both dies are recessed, as shown in Fig. 6, each blow causes both bearing bushings 42 and 43 to move slightly outwardly in their supporting frames, although if one die is a flat surface, the blow will cause only one bearing bushing to move outwardly, namely, the one adjacent to the recessed die, and in such a case the frame may then be reversed and the opposite frame member struck, thus according similar treatment to the other bearing bushing. It has been found in actual practice that good results are obtained by the arrangement shown in Fig. 6, although excellent results have also been obtained by a slow application of pressure to the opposite frame members rather than the quick hammer blow. In the event that the reduced shaft terminals 54 are of slightly lesser length, the dies 62 and 60 may be eliminated, and the lower bearing bushing 43, when in the position shown in Fig. 6, may simply be placed on a flat surface and the upper frame member 10 struck a blow which has the effect of moving the upper bearing bushing further outwardly in its supporting aperture. The frame may now be reversed, and the other frame member 11 accorded similar treatment.

One method of employing a slow application of pressure is illustrated in Fig. 9 wherein frame members 10 and 11 are illustrated as supporting shaft 24 in bearing bushings 42 and 43. The instrument utilized may comprise a substantially C shaped clamping member 64 having a recessed head portion 65 which engages frame member 10 without engaging bearing bushing 42. At its lower end the clamping member is provided with a horizontal portion 66 which supports a micrometer screw 67 having a thumb turn 68 or other means for permitting manual rotation of the screw. At its inner end the screw engages the center of shaft 24. It will thus be seen that as the screw is turned, the upper shoulder 55 of the shaft bears against bearing bushing 42 and forces it outwardly in its supporting aperture in frame member 10. Screw 67 is provided with graduations, and frame portion 66 is likewise provided with a fixed reference ring 69. Readings may be provided in thousandths of an inch. As before, the shaft 24 is initially frozen against rotation.

In the event that the micrometer screw is turned to permit longitudinal movement one thousandth of an inch for each partial rotation, and the shaft then tested for rotation, it will be seen that when the shaft finally rotates, the end play will be not more than one thousandth of an inch. In other words, if the shaft has one thousandth of an inch clearance between its opposed shoulders and the bearing bushing, it may freely rotate. Accordingly, if the micrometer lead screw is not moved more than one thousandth of an inch between successive testings of the shaft for rotation, the bearing bushing 42 will not have been moved outwardly more than one thousandth of an inch between its position wherein it freezes shaft 24 against rotation, and its position wherein it frees the shaft for rotation. In the event that considerable movement of the bearing bushing is necessary, that is to say, some five to twenty thousandths of an inch, before rotation of the shaft is permitted, it may be desirable to reverse the clamping element and move bearing bushing 43 outwardly after some movement has been accorded to bearing bushing 42. It will also be appreciated that instead of applying the pressure to the lower end of the shaft, as shown in Fig. 9, a recessed die may engage frame member 11 and the screw engage the recessed die, thus causing both bearing bushings to move outwardly at the same time.

Fig. 9 further shows in broken lines another method of moving bearing member 42 outwardly in its supporting aperture in frame 10. In this case, some bifurcated element 74 is carried on the clamping member 10, and this bifurcated element engages the enlarged central portion 28, thus forcing the shaft upwardly, and the shoulder 55 moves against the thrust bearing surface of the bearing bushing, thus forcing the latter outwardly. It will be appreciated, of course, that some appropriate screw means will be employed for moving the bifurcated element upwardly.

In the bearing structure of the present invention, as in other bearing structures for instruments of this general character, the reason for inserting the bearing bushings in the frame is that the insertable bushing normally is made from a metal which provides a better bearing surface than would the metal which is usually used in making the frames. In accordance with common practice, the bearing bushings are preferably made from relatively hard metal, such as stainless steel, whereas the frames are usually formed from brass. In all cases wherein the bearing bushing is made from harder metal than is the frame, the staking, splining, or other deformation, should be confined to the bearing bushing since it is the harder metal which must cut the slots or keyways in the softer metal. In cases, however, wherein it is desired to use a soft bearing metal such as babbitt, the deformation or staking is done in the frame member, as illustrated in Figs. 10 and 11. In this instance, frame element 70 is provided with an aperture for the reception of the bearing bushing 71, and before the bushing is inserted in the aperture, the marginal edges of the aperture are upset at a plurality of spaced points adjacent to the outer— not to the inner-surface of the frame member, as shown at 72. In this case, the offset portions cut the splines or keyways in the bearing bushing, as is shown at 73.

What I claim is:

1. In a device of the class described, the combination of a shaft formed with a reduced terminal portion at one end thereof forming a shoulder, means for mounting the shaft for rotative movement comprising a pair of spaced frame members having aligned bearing apertures for the shaft, a bearing bushing positioned in one of such apertures, the inner surface of such bushing providing a thrust-bearing surface for the shoulder of the shaft, limiting end play thereof, and a plurality of extrusions formed on the outer periphery of the bushing adjacent to its inner surface, the bearing aperture receiving such bushing having recesses therein corresponding to the extrusions, the inner terminals of such recesses forming shoulders for limiting the outward movement of the bushing.

2. In a device of the class described, the combination of a shaft formed with a reduced terminal portion at one end thereof forming a shoulder, means for mounting the shaft for rotative movement comprising a pair of spaced frame members having aligned bearing apertures for the shaft, a bearing bushing positioned in one of such apertures, the inner surface of such bushing providing a thrust-bearing surface for the shoulder of the shaft, limiting end play thereof, the bushing being provided on its outer periphery, adjacent to its inner surface, with a plurality of projections, the bearing aperture receiving such bushing being shaped complemental to such outer periphery, thereby limiting outward movement of the bushing.

3. In a device of the class described, the combination of a shaft formed with a reduced terminal portion at one end thereof forming a shoulder, means for mounting the shaft for rotative movement comprising a pair of spaced frame members having aligned bearing apertures for the shaft, a bearing bushing positioned in one of such apertures, the inner surface of such bushing providing a thrust-bearing surface for the shoulder of the shaft, limiting end play thereof, the diameter of the shaft adjacent the shoulder being less than the diameter of the adjacent face of the bushing, and a plurality of splines formed on the outer periphery of the bushing adjacent to its inner surface, the bearing aperture receiving such bushing having recesses therein corresponding to the splines, the inner terminals of such recesses forming shoulders for limiting the outward movement of the bushing, the planar relationship between the inner thrust-bearing surface of the bearing bushing and the inner surface of the frame member supporting the same determining the amount of end play of the shaft.

4. In a device of the class described, the combination of a shaft formed with reduced terminal portion at opposite ends thereof forming shoulders, means for mounting the shaft for rotative movement comprising a pair of spaced frame members having aligned bearing apertures for the shaft, bearing bushings positioned in such apertures, the inner surface of each bushing providing a thrust-bearing surface for the adjacent shoulder of the shaft, limiting end play thereof, the bushing having on its outer periphery, at a point spaced inwardly from its outer surface, a plurality of spaced projections, the bearing aperture receiving each bushing being shaped complemental to such periphery, thereby limiting outward movement of the bushing.

5. In a device of the class described, the combination of a shaft formed with reduced terminal portions at each end thereof forming shoulders, means for mounting the shaft for rotative movement comprising a pair of spaced frame members having aligned bearing apertures for the shaft, bearing bushings positioned in such apertures, the inner surface of each bushing providing a thrust-bearing surface for the adjacent shoulder of the shaft, limiting end play thereof, the diameter of the shaft adjacent the shoulder being less than the diameter of the adjacent face of the bushing, and a plurality of splines formed on the outer periphery of each bushing at a point spaced inwardly from its outer surface, the bearing aperture receiving each bushing having recesses therein corresponding to the splines, the inner terminals of such recesses forming shoulders for limiting the outward movement of the bushing, the planar relationship between the inner thrust-bearing surface of the bearing bushing and the inner surface of the frame member supporting the same determining the amount of end play of the shaft.

RICHARD I. N. WEINGART.